Feb. 25, 1958  W. M. BAUMHECKEL  2,824,921
SPEED CHANGE WARNING SYSTEM
Filed Feb. 2, 1955  3 Sheets-Sheet 1
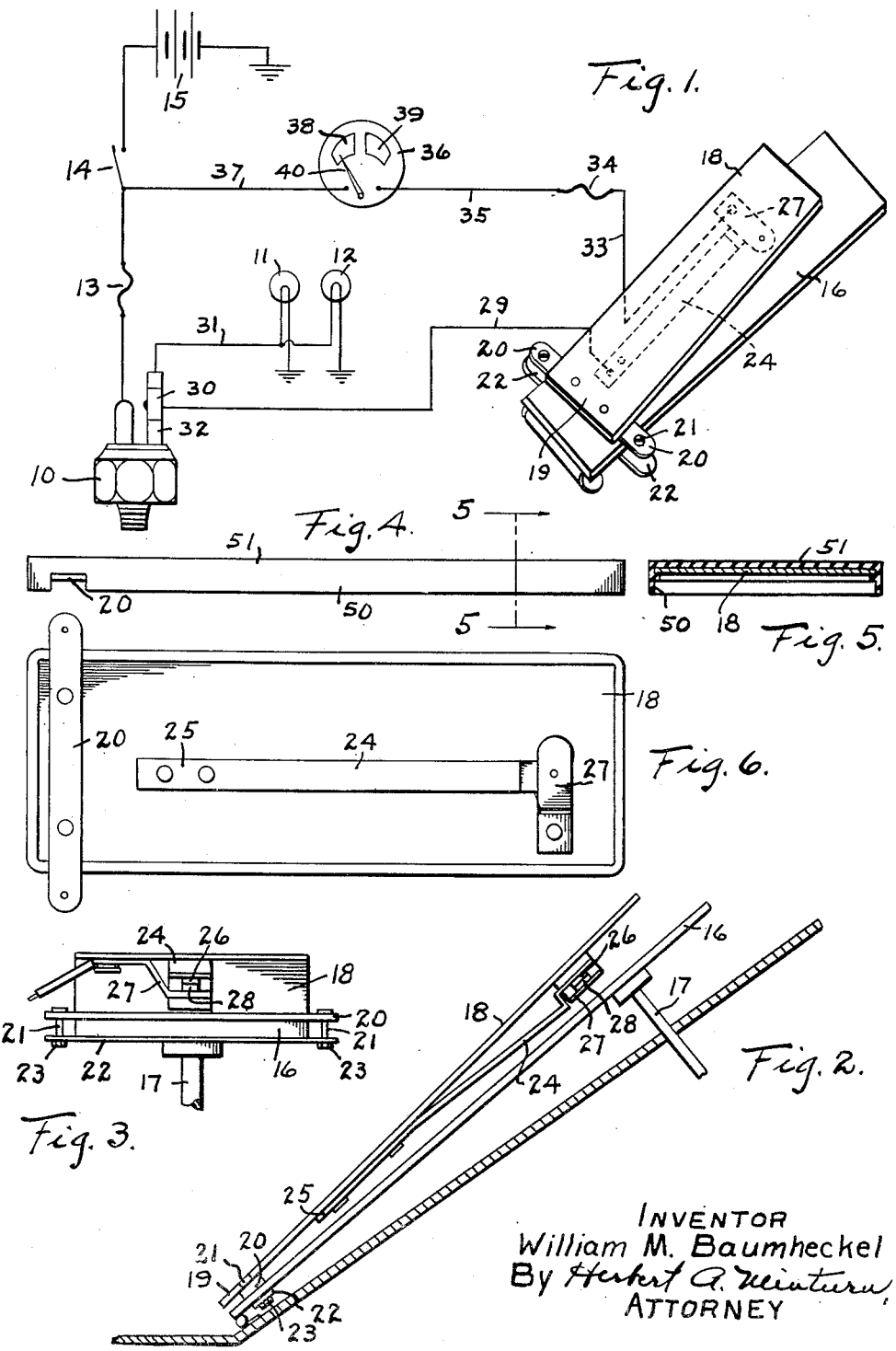
INVENTOR
William M. Baumheckel
By Herbert A. Minturn
ATTORNEY

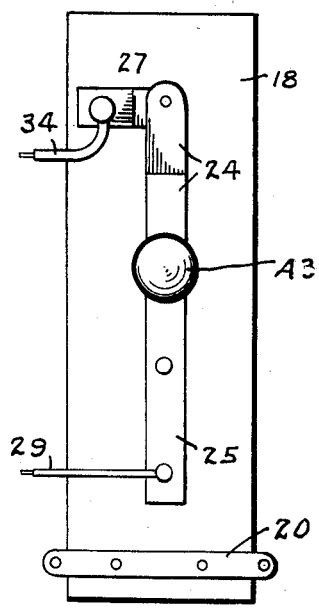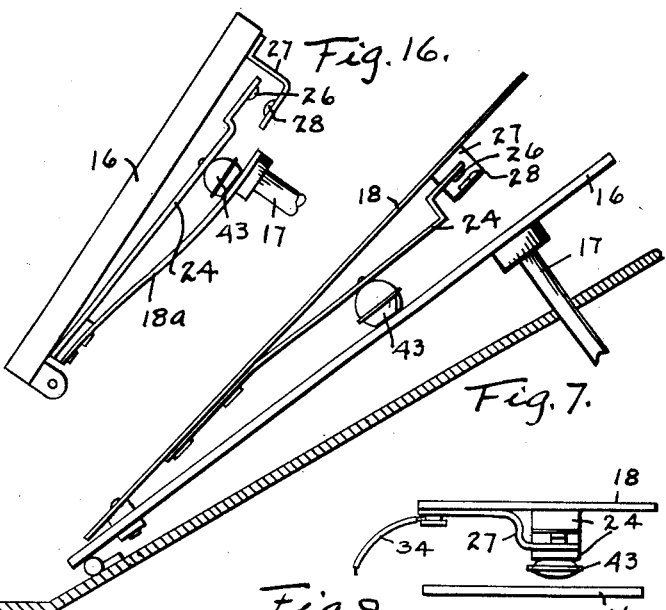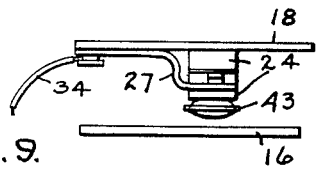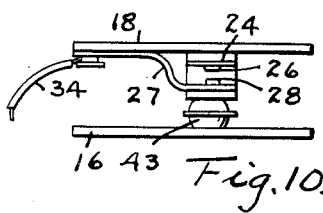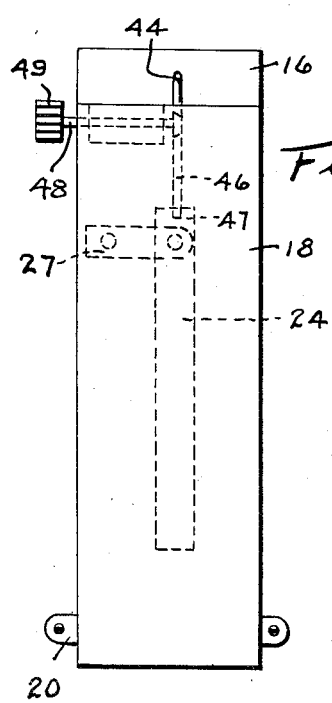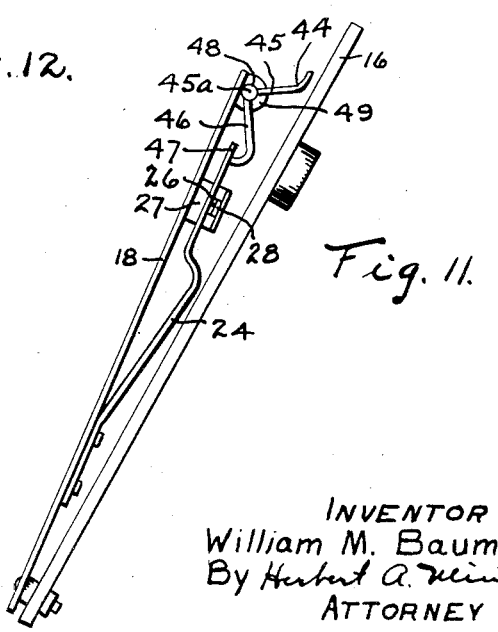
INVENTOR
William M. Baumheckel
By Herbert A. Minturn,
ATTORNEY

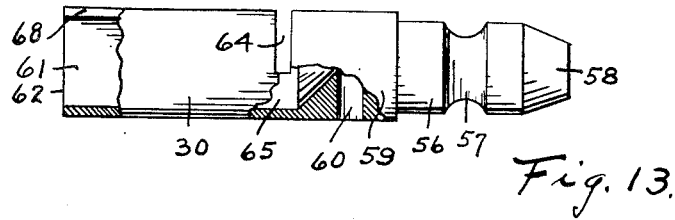
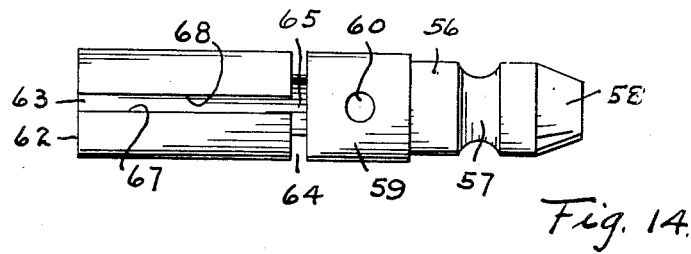
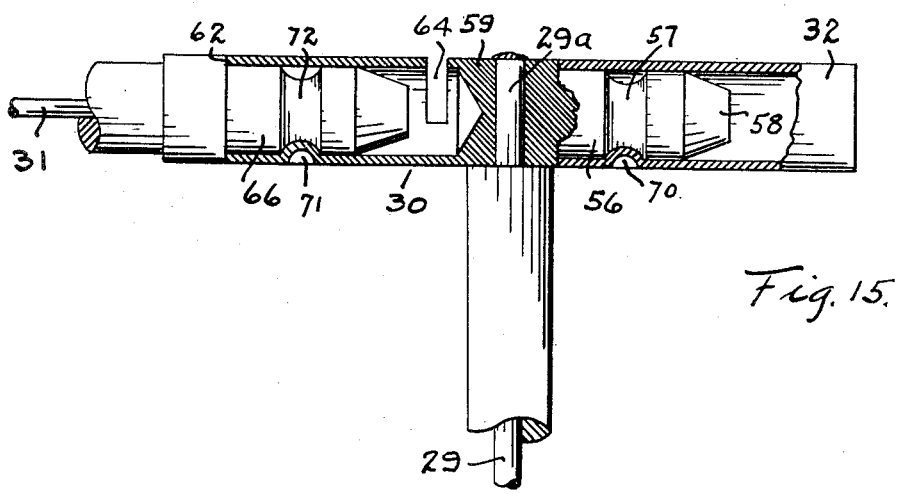

United States Patent Office 2,824,921
Patented Feb. 25, 1958

2,824,921

SPEED CHANGE WARNING SYSTEM

William M. Baumheckel, Indianapolis, Ind.

Application February 2, 1955, Serial No. 485,666

1 Claim. (Cl. 200—86.5)

This invention relates to a system for giving a warning signal at the rear ends of automotive vehicles such as passenger cars, trucks, busses, and the like to indicate first a reduced application of driving power giving a speed slow down indication and finally a stop indication. The invention supplements the normally installed brake foot pedal operated stop light.

Involved in the invention is the application of a switch mechanism operated by release of pressure on the foot throttle pedal whereby upon release of the predetermined amount of pressure, a stop light or warning light automatically is displayed at the rear of the vehicle.

A primary object of my invention is to give a warning signal the instant the driver of a car reduces pressure on the foot throttle pedal so that there is a warning to a following car that there may be a change of speed and even a stoppage of the leading vehicle. In addition, the invention involves the purpose of having a certainty that a warning signal will be displayed at the proper time, so that in addition to the foot throttle pedal actuated switch, the normal brake pedal operated signal is displayed.

A further primary object of the invention resides in the fact that the warning signal will continue to be displayed at the rear of the vehicle even after the vehicle has come to a complete and full stop.

The invention further involves a timing arrangement whereby the display of the warning signal after the vehicle has stopped may be regulated for a predetermined time if not continuous.

A further important object of the invention is easy installation of the device without change of existing members of the vehicle, and an installation wherein a minimum number of wiring connections are required.

These and many other objects and advantages of the invention will become apparent to those versed in the art in the following description of the invention as illustrated in the accompanying drawings, in which:

Fig. 1 is a schematic wiring diagram of the system;

Fig. 2 is a view in side elevation and section through a structure embodying the invention;

Fig. 3 is a view in end elevation;

Fig. 4 is a view in side elevation of the switch actuating member;

Fig. 5 is a view in transverse section on the line 5—5 in Fig. 4;

Fig. 6 is a bottom plan view of the member illustrated in Fig. 4;

Fig. 7 is a view in side elevation and section of a slightly modified form of the invention;

Fig. 8 is a bottom plan view of the switch mechanism of the form shown in Fig. 7;

Fig. 9 is a view in end elevation showing the structure of Fig. 7 in a switch-closed condition;

Fig. 10 is a view similar to that in Fig. 9 with the switch automatically operated to an open position;

Fig. 11 is a view in side elevation of a structure manually controlled for opening the circuit when the foot throttle pedal is in its normal engine idling speed position;

Fig. 12 is a view in top plan of the structure shown in Fig. 11;

Fig. 13 is a view in elevation of a quick wiring connector;

Fig. 14 a view of the connector revolved 90 degrees from the position shown in Fig. 13;

Fig. 15 a view in elevation and partial section of an application of the connector in the system; and Fig. 16 a view in side elevation of a modified form of the structure shown in Fig. 7.

The normal brake pedal actuated warning signal system is illustrated in Fig. 1 wherein a standard brake fluid pressure operated switch member 10 is interconnected with the usual stop lights 11 and 12 (there generally being two of these lights) which are grounded in the usual practice, and a fuse 13; the ignition switch 14; and the battery 15 in turn grounded. As is well known to those versed in the art, change in brake fluid pressure such as the increased pressure upon application of the brakes through the usual foot pedal will actuate the member 10 to close the circuit above indicated to cause the stop lights 11 and 12 to be illuminated.

This action of the lights 11 and 12 occurs only when the operator applies brakes, and there is always at least a second or more delay in response of the operator before the foot pedal is depressed to cause those lights 11 and 12 to be illuminated when the need for brake application becomes apparent, particularly under emergency conditions.

Now in addition to the utilization of that well known system of energizing the stop lights 11 and 12, my invention adds a control of these lamps 11 and 12 immediately responsive to a predetermined release or removal of pressure on the foot throttle pedal 16. This pedal 16 is the one normally provided for actuating the carburetor throttle valve through any suitable means such as through a control rod 17. No change whatsoever is made in the connections between the foot pedal 16 and the carburetor (not shown). Instead, there is applied to the pedal 16 a reed-like member 18, this member 18 being preferably as wide as the pedal 16. This member 18 can be made out of a suitable plastic material or it may be made out of an elastic metal in the nature of a spring.

The rear or lower end 19 of this metal piece 18 is secured to a transverse bar 20 which reaches across the pedal 16 and has bolts 21, one through each end extending down along the sides of the pedal 16 to an under transverse bar 22, and through that bar 22 to have nuts 23 serve as clamping means for drawing the two bars snugly one toward the other into compressive engagement against the intervening pedal 16. The upper bar 20 normally spaces the member 18 a distance above the pedal 16, and preferably the member 18 is inclined upwardly and away from the pedal 16 as indicated in Fig. 2.

Along the under side of the member 18 there is fixed a spring 24 secured thereto at one end 25 to extend upwardly and in spaced relation from the under side of the member 18 to carry an electrical contact 26 extending downwardly from its under side.

Also fixed to the under side of the member 18 is an arm 27 extending across and under the contact member 26 to carry a contact 28 in line with the contact 26, and normally having the contact 26 pressed thereagainst yieldingly by means of the spring 24. The spring 24 and the arm 27 are insulated one from the other.

The spring member 24 is interconnected by a wire 29 through the connector 30 and the wire 31 with the lamps 11 and 12 in parallel as usual. It is to be noted that the wire 29 makes direct connection with the terminal 32 of the pressure switch member 10 without making any change whatsoever in the internal construction thereof or in the wiring connections therewith other than to make the interconnection of the wire 29 between the member 10 and the wire 31 which normally leads to the lamps 11 and 12.

The other member 27 of the switch mechanism is connected through the wire 33 through a fuse 34 preferably of the circuit breaker type which will automatically reset itself upon the elimination of the over-load or the short circuit as is well known in practice. From the member 34, a wire 35 leads to a lamp indicator 36 from which a wire 37 leads to the ignition switch 14 to a terminal thereof such that the circuit from the battery 15 to the wire 37 will be interrupted when the switch 14 is open.

The member 36 is in the nature of an ammeter and is so calibrated and so formed that there will be the two windows 38 and 39 across which some indicating device such as a hand 40 will sweep depending upon the current flow in turn dependent upon the current usage of the lamps 11 and 12. For example, when both lamps are on or energized, the second window 39 will give that indication, indicating two lamps burning, whereas if one of those lamps may be out or removed, then the one window 38 will be the signal to show that condition. That is, one window will indicate one lamp energized and the second window will indicate both lamps being energized. This is merely an indicating device for use and observance by the operator.

In using the structure so far described in reference to the foot pedal 16, normally when the ignition switch 14 is closed, the member 18 will be in the position as indicated in Fig. 2 which is the closed circuit position having the contact members 26 and 28 pressed together. Then when the speed of the vehicle is to be increased such as in starting up the vehicle and continuing it in motion, the member 18 being on the top side of the pedal 16 and being of a light spring nature will be depressed toward the pedal 16 with the result that the spring member 24 comes into contact with that pedal 16 and is relatively pushed upwardly from the pedal 16 toward the member 18 thereby spacing apart the contacts 26 and 28 to interrupt the circuit to the lamps 11 and 12. In this manner, as long as the vehicle is moving at a constant or increasing speed, there is no indication in the nature of a warning given by the lamps 11 and 12.

Then when the operator lifts his foot slightly away from the pedal 16, the member 18 will follow upwardly in accordance with that lifting and allow the spring member 24 to return the contact 26 against the contact 28 and cause the lamps 11 and 12 to be illuminated. Thus it is to be seen that this energization of the lamps 11 and 12 automatically is effected instantly there is a change in the position of the foot of the operator in the direction away from the pedal 16 which occurs without any necessity of having to take the foot from one position and shift it laterally to another position such as is required in actuating the brake. This is particularly true in the modern type of hydraulic coupled engines to rear axles.

As will be appreciated from the foregoing description, when the member 18 is in its normal position with no pressure applied thereto, the lamps 11 and 12 remain energized as long as the ignition switch 14 is closed. It may be desirable to remove this warning signal after an interval of time when the car is standing still. In this case, reference being had to Figs. 7–10, there may be interposed a time delay operating mechanism such as the well known pneumatic control in which there is a "ball-like" member 43 fixed to the spring 24 and carried between it and the top side of the pedal 16. This member 43 is of well known construction and operation to those versed in the art particularly in the operation of time delay switches and is commercially obtainable and therefore the details of its construction are not herein set forth. It is sufficient to say that when the member 43 is compressed, there will be quite a little delay depending upon the design of the member 43 in returning to its normal position due to air flowing into the member through a small orifice through which orifice the air has been expelled when the member is compressed.

As indicated in Fig. 7, when the foot pressure on the member 18 is lightened or removed, the member 43 will hold the switch contact members 26 and 28 apart. Then when the pressure is reduced to permit the member 18 to spring away from the pedal 16, the member 43 (it being assumed that the member 18 has been pressed downwardly in the usual driving operation of the vehicle) will be in a more or less "flattened" condition as indicated in Fig. 9 and spaced from the pedal 16 so that the two contacts 26 and 28 are permitted to bear one against the other to give the warning signals. Then when the member 43 expands back to its normal position, as indicated in Fig. 10, bearing against the pedal 16, the contacts 26 and 28 are opened and spaced apart so that the warning signal is then removed.

A still further modification of the structure may be had as illustrated in Figs. 11 and 12 wherein there is fixed to the member 18 a bell crank 45 having an arm 44 on one side of a transverse axis 45a extending downwardly and upwardly in relation to the pedal 16, and a second arm 46 extending between the member 18 and the pedal 16 around in the path of the upper free end 47 of the spring 24. The axis 45a extends through a shaft 48 and this shaft carries a button 49 to one side of the pedal 16 which may be operated by turning it. When the engine is running and it is desired to stop the energization of the lamps 11 and 12, the button 49 is revolved so as to carry the arm 46 around up against the spring end 47 and thus separate the two contact members 26 and 28. This is particularly desirable for usage by law enforcing officers where they have been called to a scene of an accident or the like, and after the warning signal has been given for a sufficient interval of time when their vehicle has stopped, the signal may be interrupted in order to save battery drainage. The device automatically re-sets itself for subsequent usage when the member 18 is pressed relatively toward the pedal 16 by reason of the fact that the arm 44 will bear against that pedal 16 and rock the other arm 46 downwardly away from the spring end 47 and thus be out of the path thereof to permit the contacts to come together again and remain in contact when the vehicle stops.

The member 18 may be covered over and provided with a downwardly extending apron 50 therearound as a means for preventing the sole of the shoe of the operator from slipping in between the member 18 and the pedal 16 when the operator may move his foot about with the car or vehicle standing still. This is simply a flexible member gripping over the edges of the member 18, the member being designated by the numeral 51.

In order to facilitate the installation of the system thus far described, there is provided a connector generally designated by the numeral 30, Figs. 13 and 14. This connector 30 has a generally cylindrical insertion end 56 having a groove 57 carried therearound, and an outer frusto-conical end 58. Back of the cylindrical portion 56 there is a head 59 generally cylindrical and slightly larger in diameter than the portion 56. A bore 60 is carried transversely through this portion 59 adjacent its end at the portion 56.

Back of the transverse bore 60, the portion 59 is hollow as provided by the bore 61 and open at the end 62. Furthermore this hollow portion 61 is slit longitudinally by means of the slot 63. The portion 59 is transversely slotted as at 64 across the forward end of the slot 63 to leave a neck 65 remaining of the portion 59.

In use, the wire 29 is inserted by an insulation stripped end 29a through the bore 60 to have its outer end soldered to the portion 59 as indicated in Fig. 15.

The wire 31 is provided with a terminal end shaped exactly the same as the member 56 with its annular groove 57 and its pointed end 58 and this terminal generally designated by the numeral 66 is inserted through the end 62 causing the member to spring out slightly and frictionally grip the terminal 66 to make the electrical connection thereby. The transverse slot 64 permits the edges 67 and 68 of the slot 63 to spread one from the other under this action.

The member 10 carries a tubular terminal 32 into which the end portion 56 of the connector 30 is inserted as indicated in Fig. 15 whereby the electrical connections are completed in relation to the interconnection of the switching device with the lamps 11 and 12. The wire 37 may be interconnected with the ignition switch 14 by the usual flat terminal connection (not shown).

Following the usual practice, the members 56 and 66 are yieldingly retained in the members 32 and 30 by means of detents 70 and 71 engaging within the grooves 57 and 72 respectively of the inserted members 56 and 66.

Thus it is to be seen that in installing the device, all that is required to be done is to clamp the member 18 to the foot pedal 16; use the interconnector 30 to provide the interconnection between the usual terminal 66 leading to the warning lights and also to the terminal of the member 10; and then interconnert the other wire 37 with the ignition switch 14. The device is then ready for operation.

The structure illustrated in Fig. 16 is substantially the same as that shown in Fig. 7 with the exception that the normal foot pedal 16 is the uppermost member and the spring members 18a and 24 are located below the pedal 16. This structure is designed to avoid the necessary of having to make a special foot pedal 16 so that the one normally supplied with the vehicle may be employed and the other members attached thereto.

While I have herein shown my invention and described it in detail, it is obvious that structural variations may be employed without departing from the spirit of the invention, and I therefore do not desire to be limited to the precise forms set forth beyond the limitations which may be imposed by the following claim.

I claim:

The combination with a foot throttle member hingedly supported at one end; of a member overlying said foot member in spaced relation therefrom and secured thereto at its hinged end; said overlying member being yieldingly shiftable toward said foot member; a spring member fixed by one end to the underside of said overlying member and extending longitudinally therealong; a contact on said other end of the spring member; an element carried by the spring member disposed intermediate the ends thereof and directed toward but normally free of contact with said foot member; a second contact carried by said overlying member; said spring member contact normally bearing in closed circuit relation on said second contact; a gap between said contacts being produced by pressing the overlying member toward the foot member and bringing said element into contact with the foot member to set up a bending action in said spring member; a lever carried by said overlying member rockably mounted about a pivot with lever portions extending oppositely from the pivot; one of said portions being between said spring member and said foot member; means for rocking said lever to lift said spring member and in turn its contact from said second contact; said lever other portion being directed toward said foot member when the first portion bears against said spring member; said lever other portion rocking the first portion to remove it from pressure on said spring member upon travel of the overlying member toward the foot member.

References Cited in the file of this patent

UNITED STATES PATENTS

| | | |
|---|---|---|
| Re. 23,719 | Coombs | Oct. 6, 1953 |
| 1,858,243 | Kuzmeth | May 17, 1932 |
| 2,128,769 | Finnell | Aug. 20, 1935 |
| 2,435,389 | Good | Feb. 3, 1948 |
| 2,442,971 | Chessrown | June 8, 1948 |
| 2,452,762 | Karow | Nov. 2, 1948 |
| 2,499,296 | Buchanan | Feb. 28, 1950 |
| 2,499,297 | Buchanan | Feb. 28, 1950 |
| 2,685,005 | Anderson | July 27, 1954 |
| 2,707,214 | Kaleba et al. | Apr. 26, 1955 |
| 2,750,462 | Milster | June 12, 1956 |